US012680650B1

(12) United States Patent
Bulani

(10) Patent No.: US 12,680,650 B1
(45) Date of Patent: Jul. 14, 2026

(54) APPARATUS AND METHOD FOR HANDLING CHEMICALS

(71) Applicant: 102202203 SASKATCHEWAN LTD., Saskatoon (CA)

(72) Inventor: Dennis E. Bulani, Saskatchewan (CA)

(73) Assignee: 102202203 SASKATCHEWAN LTD., Saskatoon (CA)

( * ) Notice: Subject to any disclaimer, the term of this patent is extended or adjusted under 35 U.S.C. 154(b) by 0 days.

(21) Appl. No.: 18/956,825

(22) Filed: Nov. 22, 2024

(51) Int. Cl.
*F17C 3/02* (2006.01)
*F17C 13/02* (2006.01)

(52) U.S. Cl.
CPC .............. *F17C 3/022* (2013.01); *F17C 13/02* (2013.01); *F17C 2221/00* (2013.01); *F17C 2227/0142* (2013.01); *F17C 2250/032* (2013.01)

(58) Field of Classification Search
CPC .. A01N 1/0268; A01N 1/147; A61B 5/14532; B29C 37/0032; B29C 44/1247; B65D 88/08; B65D 88/78; B65D 90/24; C12Q 1/001; F17C 1/06; F17C 3/022; F17C 13/02; F17C 2221/00; F17C 2250/032; F13C 2227/0142; G01D 21/02
USPC .......................................................... 340/612
See application file for complete search history.

(56) References Cited

U.S. PATENT DOCUMENTS 1,799,951 A * 4/1931 Bros ....................... F24H 1/202 392/498
4,457,332 A * 7/1984 Hoshino ................ B65D 88/08 137/590
4,977,885 A * 12/1990 Herweyer ............... F24D 17/00 122/14.31
5,197,627 A * 3/1993 Disabato ................ B65D 90/24 220/4.12
5,220,638 A * 6/1993 Moore ..................... F24H 1/205 392/501
5,568,449 A * 10/1996 Rountree ................ G01S 7/527 367/908
6,143,217 A * 11/2000 Jackson .................. F24H 1/182 29/455.1

(Continued)

FOREIGN PATENT DOCUMENTS

CN 214650746 U 11/2021
KR 20130058357 A * 6/2013 .............. G01M 3/26

(Continued)

*Primary Examiner* — Stephen R Burgdorf
(74) *Attorney, Agent, or Firm* — Wiggin and Dana LLP

(57) ABSTRACT

An apparatus and method for handling chemicals. The apparatus includes a vessel comprising an exterior shell coupled to a top exterior surface and a bottom exterior surface, wherein the top exterior surface defines at least an input port and at least an output port, an interior shell coupled to a top interior surface and a bottom interior surface, wherein the interior shell defines an internal volume configured to store at least a chemical, and an insulated space between the exterior shell and the interior shell, a telematics system, wherein the telematics system comprises at least a sensor, mounted to the vessel, to collect a plurality of sensor data, at least a computing device communicatively connected to the at least a sensor, wherein the computing device is configured to communicate the plurality of sensor data with a downstream device to provide remote monitoring of the at least a chemical.

18 Claims, 10 Drawing Sheets

(56) References Cited

U.S. PATENT DOCUMENTS

| | | | | |
|---|---|---|---|---|
| 2005/0156119 | A1* | 7/2005 | Greene | C02F 1/325<br>250/436 |
| 2011/0272059 | A1 | 11/2011 | Bulani | |
| 2012/0024386 | A1* | 2/2012 | O'Leary | F28G 9/00<br>137/561 R |
| 2012/0188076 | A1* | 7/2012 | McSheffrey | F17C 13/02<br>340/539.17 |
| 2013/0168398 | A1* | 7/2013 | Kreger | B65D 90/06<br>156/280 |
| 2020/0088663 | A1* | 3/2020 | Karschnia | F16L 59/14 |
| 2020/0200402 | A1* | 6/2020 | Rouleau | F24H 1/202 |
| 2021/0079630 | A1* | 3/2021 | Poojary | G01F 1/66 |
| 2021/0356172 | A1* | 11/2021 | Porwal | F24H 9/2007 |
| 2024/0288088 | A1* | 8/2024 | Donovan | E03B 7/072 |

FOREIGN PATENT DOCUMENTS

| | | | |
|---|---|---|---|
| RU | 2812982 | C1 | 2/2024 |
| WO | 2007140406 | A2 | 12/2007 |
| WO | 2023089038 | A1 | 5/2023 |

* cited by examiner

APPARATUS AND METHOD FOR HANDLING CHEMICALS

FIELD OF THE INVENTION

The present invention generally relates to the field of chemical storage and monitoring systems. In particular, the present invention is directed to an apparatus and a method for handling chemicals comprising a vessel and a telematics system.

BACKGROUND

In industrial and agricultural settings, the storage and handling of chemicals present significant challenges. Existing solutions often involve the use of totes or other containers that may not adequately protect the chemicals from environmental conditions. These containers can lead to excess product waste and may not provide sufficient insulation to prevent chemicals from freezing or degrading. Additionally, current methods for monitoring the quantity of chemicals within these containers often require manual checks, which can be time-consuming and prone to error.

SUMMARY OF THE DISCLOSURE

In an aspect, an apparatus for handling chemicals includes a vessel having an exterior shell coupled to a top exterior surface and a bottom exterior surface, wherein the top exterior surface defines at least an input port and at least an output port, an interior shell coupled to a top interior surface and a bottom interior surface, wherein the interior shell defines an internal volume configured to store at least a chemical, a telematics system, wherein the telematics system comprises at least a sensor, mounted to the vessel to collect a plurality of sensor data, and at least a computing device communicatively connected to the at least a sensor, wherein the computing device is configured to communicate the plurality of sensor data with a downstream device to provide remote monitoring of the at least a chemical.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to apparatus and methods for handling chemicals. The apparatus includes a vessel having an exterior shell coupled to a top exterior surface and a bottom exterior surface, wherein the top exterior surface defines at least an input port and at least an output port, an interior shell coupled to a top interior surface and a bottom interior surface, wherein the interior shell defines an internal volume configured to store at least a chemical, a telematics system, wherein the telematics system comprises at least a sensor, mounted to the vessel to collect a plurality of sensor data, and at least a computing device communicatively connected to the at least a sensor, wherein the computing device is configured to communicate the plurality of sensor data with a downstream device to provide remote monitoring of the at least a chemical.

Figure 1B:
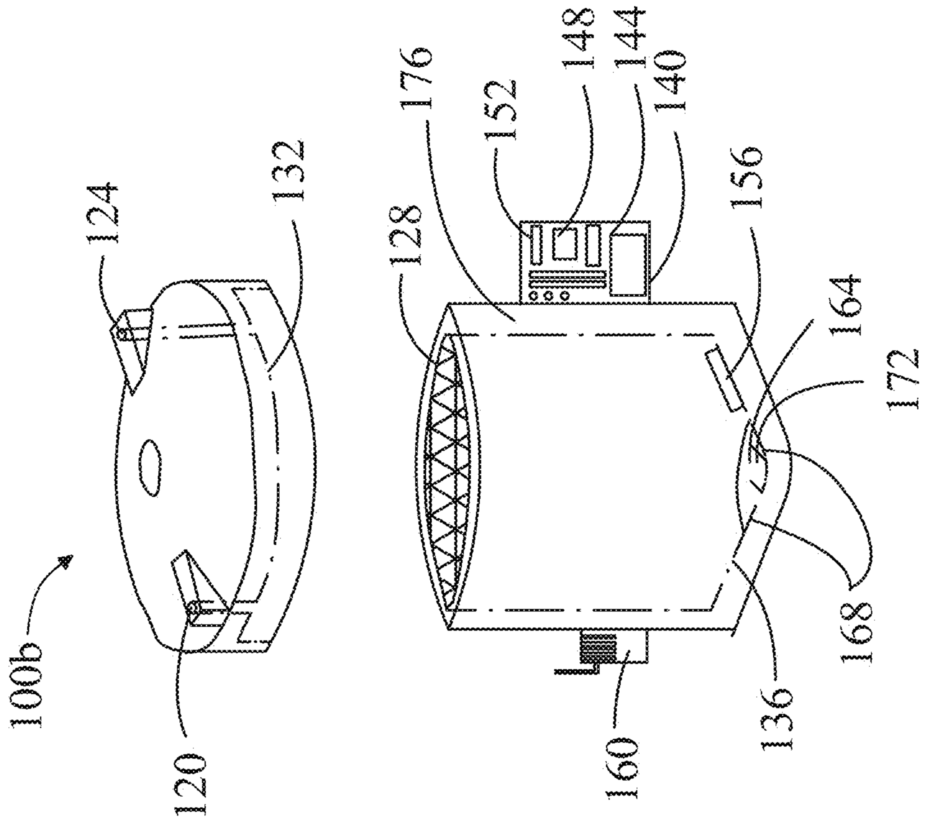
FIGS. 1A-B are exemplary illustrations of an apparatus for handling chemicals.
Figure 1A:
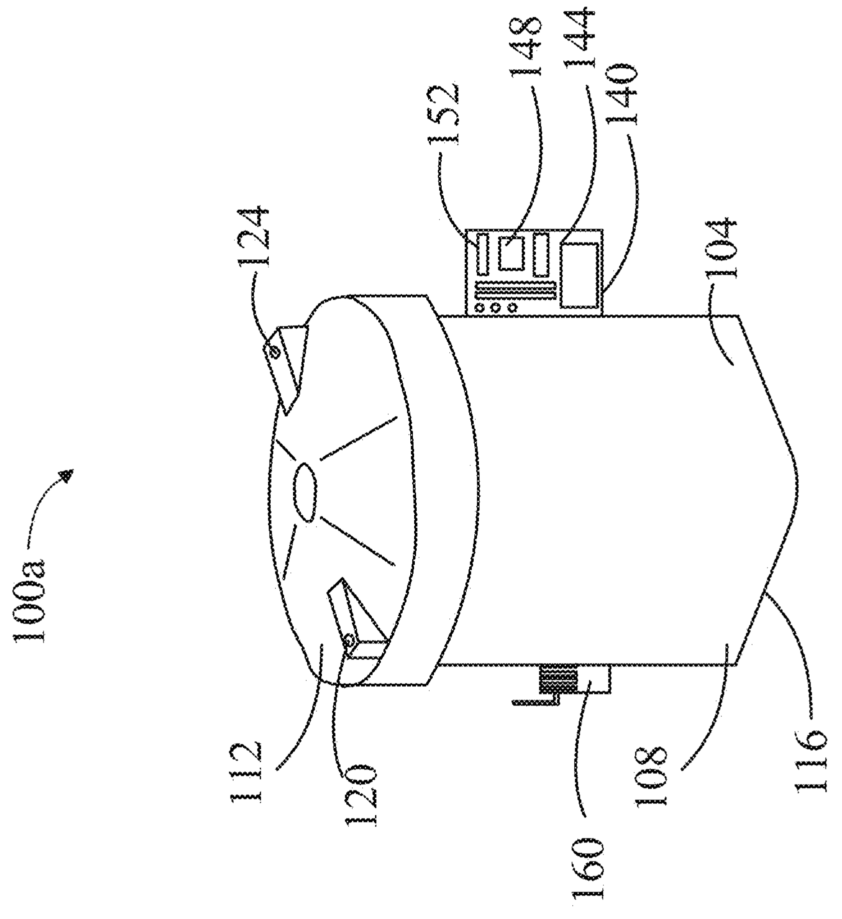

Referring now to FIGS. 1A-B, exemplary embodiments of apparatus 100*a-b* for handling chemicals. Apparatus 100*a-b* may include a processor 152 communicatively connected to a memory 148. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIGS. 1A-B, memory 148 may include a primary memory and a secondary memory. “Primary memory” also known as “random access memory” (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as “Volatile memory” wherein the volatile memory only holds information while data is being used and/or processed. In one or more embodiments, volatile memory may lose information after a loss of power. “Secondary memory” also known as “storage,” “hard disk drive” and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 152 may access the information from primary memory.

Still referring to FIGS. 1A-B, apparatus 100*a-b* may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIGS. 1A-B, apparatus 100*a-b* may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIGS. 1A-B, apparatus 100*a-b* may include any “computing device” as described in this disclosure, including without limitation a microcontroller, microprocessor, digital signal processor (DSP) and/or system on a chip (SoC) as described in this disclosure. Apparatus 100*a-b* may include, be included in, and/or communicate with a mobile device such as a mobile telephone or smartphone. Apparatus 100*a-b* may include a single computing device operating independently, or may include two or more computing devices operating in concert, in parallel, sequentially or the like; two or more computing devices may be included together in a single computing device or in two or more computing devices. Apparatus 100*a-b* may interface or communicate with one or more additional devices as described below in further detail via a network interface device. Network interface device may be utilized for connecting processor 152 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 152 may include but is not limited to, for example, a computing device or cluster of computing devices in a first location and a second computing device or cluster of computing devices in a second location. Apparatus 100*a-b* may include one or more computing devices dedicated to data storage, security, distribution of traffic for load balancing, and the like. Apparatus 100*a-b* may distribute one or more computing tasks as described below across a plurality of computing devices of computing device, which may operate in parallel, in series, redundantly, or in any other manner used for distribution of tasks or memory between computing devices. Apparatus 100*a-b* may be implemented, as a non-limiting example, using a “shared nothing” architecture.

With continued reference to FIGS. 1A-B, processor 152 may be designed and/or configured to perform any method, method step, or sequence of method steps in any embodiment described in this disclosure, in any order and with any degree of repetition. For instance, processor 152 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 152 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIGS. 1A-B, apparatus 100*a-b* includes a vessel 104 having exterior shell 108 coupled to top exterior surface 112 and bottom exterior surface 116, wherein the top exterior surface 112 defines at least an input port 120 and at least an output port 124, interior shell 128 coupled to top interior surface 132 and bottom interior surface 136, interior shell 128 defines an internal volume configured to store at least a chemical, and insulated space 176 between exterior shell 108 and interior shell 128. As used in this disclosure, a "vessel" is a container or tank designed to hold and store chemical. In a non-limiting example, vessel 104 may provide storage for chemicals 164 that require specific conditions such as controlled temperature and pressure, as discussed in more detail below. In a non-limiting example, vessel 104 may be constructed from materials that can withstand the chemical properties of the substances they contain to ensure safe storage and prevent leaks, contamination, or reactions with the vessel material. In a non-limiting example, vessel 104 may come in various sizes and shapes, depending on the volume and type of chemical being stored.

With continued reference to FIGS. 1A-B, in a non-limiting example vessel 104 may be 44 inches to 144 inches in height. Continuing, this range in height may allow vessel 104 to accommodate different operational requirements and spatial constraints. In a non-limiting example vessel 104 may be 100 inches to 225 inches in diameter. In a non-limiting example, vessel 104 may be assembled from various sized components. In another non-limiting example, vessel 104 may be constructed from a single piece of material. Continuing, the aforementioned construction method may provide superior structural integrity and reduce the risk of leaks or failures at seams and joints With continued reference to FIGS. 1A-B, as used in this disclosure, an "exterior shell" is the outermost layer or structure that encloses and protects vessel 104. Without limitation, exterior shell 108 may be designed to withstand various external conditions and potential impacts while preventing the stored chemical from leaking or being contaminated. Without limitation, exterior shell 108 may provide structural integrity, ensuring that vessel 104 can safely hold the chemical contents under the specified storage conditions, which may include certain pressures, temperatures, and exposure to environmental elements. In a non-limiting example, the materials used for exterior shell 108 may include materials that are durable, resistant to chemicals 164, and with a high mechanical strength factor. For example, without limitation, exterior shell 108, top exterior surface 112, and bottom exterior surface 116 may be constructed out of stainless steel, carbon steel, fiberglass-reinforced plastic (FRP), polyethylene, and the like. Without limitation stainless steel may be used for its high durability and excellent resistance to corrosion, making it appropriate for storing a wide range of chemicals 164, including both acids and bases. Without limitation, carbon steel may be used to construct exterior shell 108 because carbon steel offers strength and cost-effectiveness, however carbon steel may require protective coatings to enhance its resistance to corrosion. In another non-limiting example, fiberglass-reinforced plastic (FRP) may be utilized for exterior shell 108 because FRP combines the strength of fiberglass with the chemical resistance of plastic. Without limitation FRP may be an ideal choice for highly corrosive substances. Conversely, without limitation, polyethylene (PE) may be used to construct exterior shell 108 as it is lightweight, durable, and resistant to a variety of chemicals 164.

With continued reference to FIGS. 1A-B, as used in this disclosure, a "top exterior surface" the outermost surface of vessel 104 uppermost section. In a non-limiting example, top exterior surface 112 may be exposed to the external environment and can include features such as access hatches, vents, manways, or fittings for connecting to other equipment or instrumentation. In a non-limiting example, top exterior surface 112 may include the part of vessel 104 that faces upward and may be designed to ensure the containment and safe handling of the chemicals 164 stored within the vessel. For example, without limitation, top exterior surface 112 may be flat or slightly domed to prevent the accumulation of liquids or debris.

With continued reference to FIGS. 1A-B, bottom exterior surface 116 may include at least a durability feature. Without limitation, the at least a durability feature may include one or more of a ribbed feature, one or more drainable channels, a protective coating, one or more feet, and one or more mounting points. As used in this disclosure, a "bottom exterior surface" is the outermost surface positioned at the base of vessel 104. As used in this disclosure, a "durability feature" is a specific characteristic or component of an apparatus that enhances the apparatus's ability to withstand wear, damage, or aging over time. In a non-limiting example, bottom exterior surface 116 may come into contact with the supporting surface or ground. In a non-limiting example, bottom exterior surface 116 may be designed with specific features to enhance vessel 104 durability, ease of handling, or resistance to environmental factors such as, without limitation, a reinforced base, a ribbed or textured surface, one or more drainage channels, protective coatings, integrated feet or pads, handling features, impact resistant design, mounting points, and the like. As used in this disclosure, a "reinforced base" is additional layers of material or structural supports to increase vessel 104 strength. In a non-limiting example, the reinforced base may provide vessel 104 with the ability to withstand heavy loads and impacts. In another non-limiting example, bottom exterior surface 116 may be ribbed or textured to provide extra grip and prevent slipping, both for vessel 104 itself on its supporting surface and for handling during transport. In another non-limiting example, bottom exterior surface 116 may include built-in drainage channels or grooves. Without limitation, the drainage channels or grooves may facilitate the easy removal of liquids, preventing pooling and reducing the risk of corrosion or chemical damage. In a non-limiting example, bottom exterior surface 116 may include special protective coatings or treatments. Without limitation these coatings may be applied to resist chemical corrosion, UV damage, and other environmental factors. In a non-limiting example, bottom exterior surface 116 may include integrated feet or pads made of durable, non-slip materials. Without limitation, these feet or pads may elevate vessel 104 slightly above the ground, improving stability and allowing for airflow to prevent moisture buildup. In a non-limiting example, bottom exterior surface 116 may be designed to include built-in handles or grip points for easy lifting and maneuvering, ensuring safe and efficient handling during transport and installation. In a non-limiting example, bottom exterior surface 116 may include impact-resistant design elements, such as rounded edges or shock-absorbing materials, to protect vessel 104 from damage during handling or accidental drops. In a non-limiting example, bottom exterior surface 116 may be pre-drilled holes or mounting points may be provided to secure the vessel in place, ensuring it remains stable and stationary during use. In a non-limiting example, bottom exterior surface 116 may be the part of vessel 104 that bears the weight of the contents and interacts with the environment, potentially requiring special coatings or materials to resist corrosion, chemical spills, or physical damage, as described herein.

With continued reference to FIGS. 1A-B, as used in this disclosure, an "input port" is an opening or inlet through which chemicals 164 or other substances are introduced into vessel 104. In a non-limiting example, input port 120 may be designed with various features to ensure safe, controlled, and efficient transfer of materials, such as valses, seals, fittings, safety mechanisms, and the like. As used in this disclosure, a "valve" is a device that regulates, directs, or controls the flow of fluids by opening, closing, or partially obstructing various passageways. In a non-limiting example, input port 120 may be designed with a valve to control the flow of chemicals 164 into the container and prevent spills or leaks. As used in this disclosure, a "seal" is a material or device used to prevent the escape of fluids from a container, ensuring the integrity of the storage system by providing a tight closure. In a non-limiting example, input port 120 may be designed with seals to maintain the integrity of the container and prevent contamination. As used in this disclosure, a "fitting" is a component used to connect sections of pipe, hose, or tubing within the system, facilitating the transfer of fluids and ensuring secure connections. In a non-limiting example, input port 120 may be designed with fittings to accommodate hoses, pipes, or other equipment used in the transfer process. As used in this disclosure, a "safety mechanism" is a device or feature integrated into the system to prevent accidents, such as overfilling, and to manage pressure differences. For example, without limitation, the safety mechanism may include pressure relief valves to release excess pressure to prevent vessel 104 from rupture. Continuing, the safety mechanism may include overfill protection devices to automatically stop the flow of chemicals 164 when vessel 104 reaches its capacity. Continuing, the safety mechanism may include one or more emergency shut-off valves which may be designed to quickly stop the flow of chemicals 164 in the event of a malfunction or leak. Continuing, other examples of safety mechanisms may include burst discs, which rupture at a predetermined pressure to relieve excess pressure and one or more level sensors, which monitor the fluid level in the container and trigger alarms or shut-offs if unsafe levels are detected.

With continued reference to FIGS. 1A-B, as used in this disclosure, an "output port" is a component designed for the discharge of stored chemicals 164 within vessel 104. In a non-limiting example, output port 124 may be located at the lower part of vessel 104 to facilitate gravity-assisted flow and ensure complete drainage of the contents as discussed more in FIG. 6. In another non-limiting example, output port 124 may be designed to connect seamlessly with various transfer systems, such as hoses, pipes, or pumps to enable the controlled and precise release of chemicals 164. In a non-limiting example, output port 124 may be located at the top part of vessel 104 where the chemicals 164 are pumped out of vessel 104 as further described in FIG. 5. In a non-limiting example, output port 124 may include a valve mechanism that may be securely closed when not in use to prevent leaks and contamination. In a non-limiting example, output port 124 may be designed to be compatible with the chemical properties of the stored substances, ensuring resistance to corrosion, chemical reactions, and environmental factors as previously discussed herein. In a non-limiting example, output port 124 may provide proper sealing and robust construction to maintain safety standards and prevent accidental spills.

With continued reference to FIGS. 1A-B, as used in this disclosure, an "interior shell" is the innermost layer or lining of vessel 104 that comes into direct contact with the stored chemicals 164. In a non-limiting example, interior shell 128 may be critical for maintaining the integrity and safety of vessel 104. In a non-limiting example, interior shell 128 may be specifically designed to resist the corrosive and reactive nature of various chemicals 164. In a non-limiting example, interior shell 128 may be made from materials such as stainless steel, specialized plastics, or chemically resistant coatings, as discussed herein, interior shell 128 may serve as a barrier that protects the structural components of vessel 104 from chemical degradation. In an embodiment, interior shell 128 may be made of a plastic material and encased within a steel shell surrounding interior shell 128. In yet another non-limiting example, interior shell 128 may be comprised of any material as described herein and encased within a steel shell. Additionally, interior shell 128 may ensure that the stored chemicals 164 remain uncontaminated by external substances. In a non-limiting example, interior shell 128 may be designed and constructed to prevent leaks, ensure the longevity of vessel 104, and maintain safety standards in environments where hazardous materials are stored. For example, without limitation, interior shell 128 may be construction process may involve precision manufacturing techniques such as welding, molding, or coating application to create a seamless and impermeable barrier. Additionally and or alternatively, interior shell 128 may include features such as reinforced joints, smooth surfaces to prevent chemical buildup, and coatings that resist abrasion and chemical reactions. In a non-limiting example, interior shell 128 may be inspected to ensure quality control of the material and function. Without limitation, interior shell 128 may be tested to ensure performance standards are in compliance. In a non-limiting example, interior shell 128, top interior surface 132, and bottom interior surface 136 may be made out of one or more of polyethylene, polypropylene, fiberglass-reinforced plastic, and polyvinylidene fluoride. As used in this disclosure, "polyethylene (PE)" is a durable, lightweight plastic. In a non-limiting example, PE may be used in the construction of chemical storage tanks. Without limitation, PE may include high-density polyethylene (HDPE). Without limitation, HDPE may withstand and resist a wide range of chemicals, including acids, bases, and solvents. As used in this disclosure, "polypropylene (PP)" is a type of plastic known for its excellent chemical resistance. Without limitation, PP may withstand various acids and alkalis and may be used in the storage of corrosive substances As used in this disclosure, "polyvinylidene fluoride (PVDF)" is a highly non-reactive and pure thermoplastic that resists corrosion and can handle high temperatures.

With continued reference to FIGS. 1A-B, as used in this disclosure, a "top interior surface" is the innermost ceiling portion of vessel 104. In a non-limiting example, top interior surface 132 may come into direct contact with the stored chemical substance. In a non-limiting example, top interior surface 132 may maintain the integrity and safety of the stored chemicals 164. In a non-limiting example, top interior surface 132 may be designed and constructed from materials that are resistant to corrosion, chemical reactions, and potential contamination, as described herein, ensuring that the chemicals 164 do not interact with the container itself. In a non-limiting example, top interior surface 132 may include features such as seals, coatings, or liners, as previously discussed, that may provide an additional layer of protection and help maintain the purity and stability of the chemicals 164.

With continued reference to FIGS. 1A-B, as used in this disclosure, a "bottom interior surface" is the innermost layer at the base of vessel 104. In a non-liming example, bottom interior surface 136 may come into direct contact with the stored chemicals 164. In a non-liming example, bottom interior surface 136 may ensure the safe and efficient containment of the chemicals 164. For example, without limitation, bottom interior surface 136 may be constructed from materials that are resistant to corrosion, chemical reactions, and physical wear as discussed herein. In a non-liming example, bottom interior surface 136 may be designed, as previously discussed, to prevent leaks and contamination, maintaining the purity and stability of the stored substances, and facilitate easy cleaning and maintenance.

With continued reference to FIGS. 1A-B, bottom interior surface 136 of vessel 104 may include tapered shape 168, wherein tapered shape 168 is configured to generate concentrate 172. As used in this disclosure, a "tapered shape" is a form that gradually decreases in width, thickness, or diameter from one end to the other. In a non-limiting example, tapered shape 168 may include a gradual reduction. In a non-limiting example, the gradual reduction may be linear or curved, and the gradual reduction may create a streamlined appearance of bottom interior surface 136 of vessel 104. As used in this disclosure, a "concentrate" is the area within vessel 104 where chemical 164 naturally accumulates due to the shape of vessel 104. In a non-limiting example, vessel 104 may be narrow towards the bottom, allowing gravity to cause chemical 164 to flow and collect in this tapered section, and thus may create concentrate 172. Without limitation, tapered shape 168 of bottom interior surface 136 may ensure that chemical 164 is easily accessible and can be efficiently extracted or measured from the narrowest point in vessel 104. Without limitation, the narrowest point of vessel 104 may facilitate the complete drainage or easy access to concentrate 172, optimizing the use of the contents within vessel 104. With continued reference to FIGS. 1A-B, in a non-limiting example, vessel 104 may be used to handle chemicals 164. For instance, vessel 104 may be used to handle chemicals 164 associated with the agriculture industry such as, without limitation, chemicals used to spray farms which may include a variety of substances designed to protect crops, enhance growth, and ensure productive yields. Continuing, chemicals 164 may include herbicides, such as glyphosate and atrazine, to control unwanted weeds that compete with crops for nutrients. Continuing, chemicals 164 may include insecticides like neonicotinoids and pyrethroids to manage insect pests that can damage plants. Chemicals 164 may include fungicides, including azoxystrobin and chlorothalonil, used to prevent and treat fungal diseases that can devastate crops. Additionally and or alternatively, chemicals 164 may include fertilizers, which may contain essential nutrients like nitrogen, phosphorus, and potassium, sprayed to promote healthy plant growth. Continuing, chemicals 164 may include soil conditioners, such as lime and gypsum, improve soil structure and pH balance, to enhance the overall growing conditions. Continuing, chemicals 164 may include growth regulators, like gibberellins and auxins, to influence the growth processes of plants, ensuring optimal development.

With continued reference to FIGS. 1A-1B, as used in this disclosure, an "internal volume" is the space within an enclosed container where substances such as liquids, gases, or solids are stored or processed. In a non-limiting example, the internal volume may be entirely contained within the boundaries of vessel 104. Without limitation, the internal volume may not interact with the external environment except through controlled openings or ports, such as input port 120 and output port 124. As used in this disclosure, an "insulated space" is an area or volume that is separated and protected from external conditions. In a non-limiting example, the insulated space 176 may protect chemicals 164 from external conditions such as temperature changes, sound, or moisture, through the use of insulating materials. Without limitation, the insulating materials may be designed to reduce or prevent the transfer of heat, sound, or other forms of energy between the insulated space and its surroundings. In a non-limiting example, the insulating material may include fiberglass, polyurethane, polystyrene, mineral wool, aluminum foil, and the like.

Still referring to FIGS. 1A-B, apparatus 100*a-b* includes telematics system 140 wherein telematics system 140 includes at least a sensor, mounted to vessel 104, to collect a plurality of sensor data, at least a computing device 144 communicatively connected to the at least a sensor, wherein the computing device is configured to communicate the plurality of sensor data with a downstream device to provide remote monitoring of the at least a chemical 164. As used in this disclosure, a "telematics system" is an integrated system that combines telecommunications and informatics to monitor and manage the transport and storage conditions of chemicals 164. In a non-limiting example, telematics system 140 may include various sensors to monitor critical parameters such as temperature, pressure, and humidity inside vessel 104.

With continued reference to FIGS. 1A-B, telematics system 140 may include different hardware for specific measurements. In some embodiments, hardware may include transducers, sensors, and actuators. For the purposes of this disclosure, a "transducer" is a device used to transform one kind of energy into another. When a transducer converts a quantity of energy to an electrical voltage or an electrical current it is called a sensor. A measurable quantity of energy may include sound pressure, optical intensity, magnetic field intensity, thermal pressure, etc. When a transducer converts an electrical signal into another form of energy such as sound, light, mechanical movement, it is called an actuator. It should be noted that sound is incidentally a pressure field. Actuators allow the use of feedback at the source of the measurements.

With continued reference to FIGS. 1A-B, a sensor may be considered as a component or with a collection of electronics such as amplifiers, decoders, filters, computer devices and telematics system 140. For the purposes of this disclosure an "instrument" is a sensor bundled with its associated electronics. However, in some embodiments, sensors may be further integrated with apparatus 100*a-b*. Without limitation, at least a sensor 156 may include one or more of a weight sensor, a volume sensor, a load cell, and an optical sensor. As used in this disclosure, a "weight sensor" is a device that measures the force exerted on it, typically converting this force into an electrical signal that can be read and recorded. As used in this disclosure, a "volume sensor" measures the amount of space that a substance occupies. Without limitation, the volume sensor may utilize methods such as ultrasonic waves, pressure differences, or flow rates to calculate the volume. For instance, without limitation, an ultrasonic sensor may be used in vessel 104 to determine the remaining volume of chemicals 164 by measuring the distance to top interior surface 132. As used in this disclosure, a "load cell" is a type of transducer specifically designed to measure weight or force applied to it, converting this measurement into an electrical signal. As used in this disclosure, an "optical sensor" detects changes in light or other electromagnetic waves. In a non-limiting example, the optical sensor may be used for measuring distance, detecting presence, or identifying colors. In another non-limiting example, at least a sensor may include, without limitation, temperature sensors. Continuing, temperature sensors may be employed to continuously track the temperature inside vessel 104. Continuing, this may ensure that chemicals 164 remain within safe limits to prevent chemical degradation or reactions. In another non-limiting example, at least a sensor 156 may be attached to interior shell 128 of vessel 104. In another non-limiting example. At least a sensor 156 may be integrated into vessel 104 structure to provide a seamless design and accurate readings at different points. Additionally and or alternatively, at least a sensor 156 may include pressure sensors that may be used to monitor the internal pressure of vessel 104. Continuing, pressure monitoring may be especially important for gases or volatile liquids, and might be affixed to top interior surface 132 or embedded in vessel 104 body. Additionally and or alternatively, at least a sensor 156 may include humidity sensors. Without limitation, the humidity sensors may be installed to detect moisture levels and used to prevent conditions that may lead to corrosion or contamination. Without limitation, humidity sensors may be mounted on interior shell 128 or near vessel 104 opening. Additionally and or alternatively, at least a sensor 156 may include leak detection sensors. Without limitation, the leak detection sensors may be placed at critical points, such as seals or joints, to promptly identify any breach of chemicals 164 outside of vessel 104. Continuing, at least a sensor 156 may transmit data wirelessly to telematics system 140. In a non-limiting example, the plurality of sensor data may be analyzed in real-time to trigger alerts and initiate corrective actions if necessary as discussed in more detail below.

With continued reference to FIGS. 1A-B a sensor integrated with telematics system 140 may be linear so that response y to a stimulus x is in the form: $y(x)=Ax$, $0 \le x \le x_{max}$, $A>0$. It should be noted, there is a presumption that the stimulus to be positive. A is the sensitivity of the transducer gain, or the gain of the sensor. The gain is presumed to be positive for which the linear model satisfies the definition of linearity: $y(x+z)=A(x+z)=y(x)+y(z)$. It should be noted that this example is an idealized form of a sensor and may extend beyond the linearity constraints which may include time dependency, memory, and its output keeping track of input. A more generalized sensor may include the steady state transfer function of the sensor. For this case, the sensitivity can be defined as the derivative of the output with respect to the input:

$$S = \frac{\partial y}{\partial x}.$$

In this example, the sensor exhibits sensitivities to other operating parameters (i.e., supply voltage) or temperature. For the purposes of this disclosure, "sensitivity" is the ratio of output to input. This can include electrical output and signal input or an input transducer. It can also include physical output to an electrical input, or an output transducer. Sensitivity can also be used in its usual electrical meaning. In this it would refer to a percent change of a property of a device because of a percent change in a parameter. In some embodiments this would be a percent change in gain as a result of percent change in ambient temperature. This type of sensitivity may be referred to as the Gain of a sensor.

With continued reference to FIGS. 1A-B, as used in this disclosure, a "downstream device" is an electronic device that presents information to the entity. In some cases, downstream device may be configured to project or show visual content generated by computers, video devices, or other electronic mechanisms. In some cases, downstream device may include a liquid crystal display (LCD), a cathode ray tube (CRT), a plasma display, a light emitting diode (LED) display, and any combinations thereof. In a non-limiting example, one or more downstream device may vary in size, resolution, technology, and functionality. Downstream device may be able to show any data elements and/or visual elements as listed above in various formats such as textural, graphical, video among others, in either monochrome or color. Downstream device may include, but is not limited to, a smartphone, tablet, laptop, monitor, tablet, and the like. Downstream device may include a separate device that includes a transparent screen configured to display computer generated images and/or information. In some cases, downstream device may be configured to present a graphical user interface (GUI) to a user, wherein a user may interact with a GUI. In some cases, a user may view a GUI through downstream device. Additionally, or alternatively, processor 152 be connected to downstream device. In one or more embodiments, transmitting sensor data may include displaying sensor data at downstream device using a visual interface.

Still referring to FIGS. 1A-B, a telematics system 140 with integrated sensors may not respond to arbitrarily small signals. telematics system 140 may respond to signals within a specified range from zero to a sensor threshold which does not cause the output of the sensor to change. The existence of a threshold relates to the nonlinear behavior of the device and the noise. A telematics system 140 with an integrated sensor may fail to respond to stimuli which are arbitrarily large as well. In this case, telematics system 140 integrated with a sensor may have a max range. The full range of telematics system 140 integrated with a sensor may be limited by compression or clipping. Compression and clipping are results of nonlinearity and thus may include telematics system 140 as a nonlinearity device.

Still referring to FIGS. 1A-B, referring to the linear equation above assuming a linear sensor is improved with the addition of a constant: $y(x)=b_0+Ax$. It should be noted that the equation is not linear even though it is described as a first order polynomial. The constant is called a zero offset and can be defined in two ways: a sensor reading when the input is zero, or the value of the stimulus required to make the output zero. The zero offset is corrected by subtracting $b_0$ from y and recovering the linear description of a sensor: $y'(x)=y(x)-b_0=Ax$.

With continued reference to FIGS. 1A-B, telematics system 140 may include very fast measurements where it can internally store energy. telematics system 140 output may depend on previous measurements the integrated sensors make. It should be noted that the sensor may exhibit memory. The time dependence of a sensor can be linear if the response is described by a linear differential equation:

$$\sum_{n=0}^{N} A_n \frac{\partial^n y}{\partial t^n} = \sum_{k=0}^{k} B_k \frac{\partial^k x}{\partial t^k}.$$

Taking the Laplace transform of this equation:

$$y(s, X) = \left( \frac{\sum_{k=0}^{K} B_k S^k}{\sum_{n=0}^{N} A_n S^n} \right) x = H(s)X(s),$$

which is in Laplace transform space and the sensor response is still linear in stimulus x. The response of a sensor with a transfer function H(s) at time t is the convolution integral between the history of the stimulus x and the inverse Laplace transform $$h(t) \text{ of } H(s) : y(t) = \int_0^\infty h(\tau)x(t-\tau)d\tau.$$

telematics system 140 may behave like a low pass filter, wherein there is a delayed response to their input. There is a limit to the maximum stimulus frequency that can be detected. The maximum frequency a sensor can interpret is approximately the inverse of its response time.

Data from these sensors are transmitted via wireless networks to a central control unit, where it can be analyzed and used to ensure optimal storage conditions are maintained, preventing chemical degradation or hazardous situations. Additionally, the telematics system can provide alerts and notifications to operators about potential issues, enable remote control of environmental conditions, and ensure compliance with safety and regulatory standards.

With continued reference to FIGS. 1A-B, telematics system may include at least a communication module 160. As used in this disclosure, a "communication module" is component in a telematics system that facilitates the transmission and reception of data between different devices and systems. In a non-limiting example, communication module 160 may act as an interface that connects at least a sensor 156 and other data-generating components to the central monitoring system. In a non-limiting example, communication module 160 may utilize wireless communication technologies such as cellular networks, satellite links, Wi-Fi, Bluetooth, and any other wireless communication technology as discussed herein. In a non-limiting example, communication module 160 may collect data from at least a sensor 156, process the plurality of sensor data, and transmit the plurality of sensor data to downstream devices, as discussed more in FIG. 2, such as remote servers or control units for analysis and action. In a non-limiting example, communication module 160 may also receive commands or configuration updates from the central system and relay them to local devices. Continuing, this bidirectional communication may ensure real-time monitoring and control, enabling efficient management and immediate response to any issues. In another non-limiting example, at least a communication module 160 may be configured to receive the plurality of sensor data and transmit an alert to a user as discussed in more detail below.

With continued reference to FIG. 1A-B, apparatus 100*a-b* may include a pressurized system. In a non-limiting example, the pressurized system may eliminate the need for a pump by leveraging the internal volume's pressure to dispense chemical 164. In a non-limiting example, there may be consistent pressure within the internal volume when chemical 164 is injected through input port 120 on top exterior surface 112. Continuing, due to the pressure difference between the internal volume and the external environment, chemical 164 may be pushed out of the internal volume when a passage between the internal volume and the external environment is opened, thereby creating a passive flow. Without limitation, using a pump, as described in more detail in FIG. 5, may result in an active flow.

For example, without limitation, the pressurized system may be designed to maintain a steady internal pressure, ensuring that chemical 164 is always ready for dispensing. Continuing, this consistent pressure may allow for a more efficient and reliable operation, as the need for the pump and its associated complexities are removed. Additionally and or alternatively, apparatus 100*a-b* may include a specially designed input port 120 that optimizes the injection of chemical 164 into the internal volume. Continuing, input port 120 design may maintain the desired pressure levels, thereby enhancing the overall functionality and reliability of the system.

With continued reference to FIG. 1A-B, apparatus 100*a-b* may be equipped with a mechanism to precisely control the opening of the passage between the internal volume and the external environment. Continuing, this mechanism may be designed to ensure that chemical 164 is dispensed smoothly and consistently.

Figure 2:
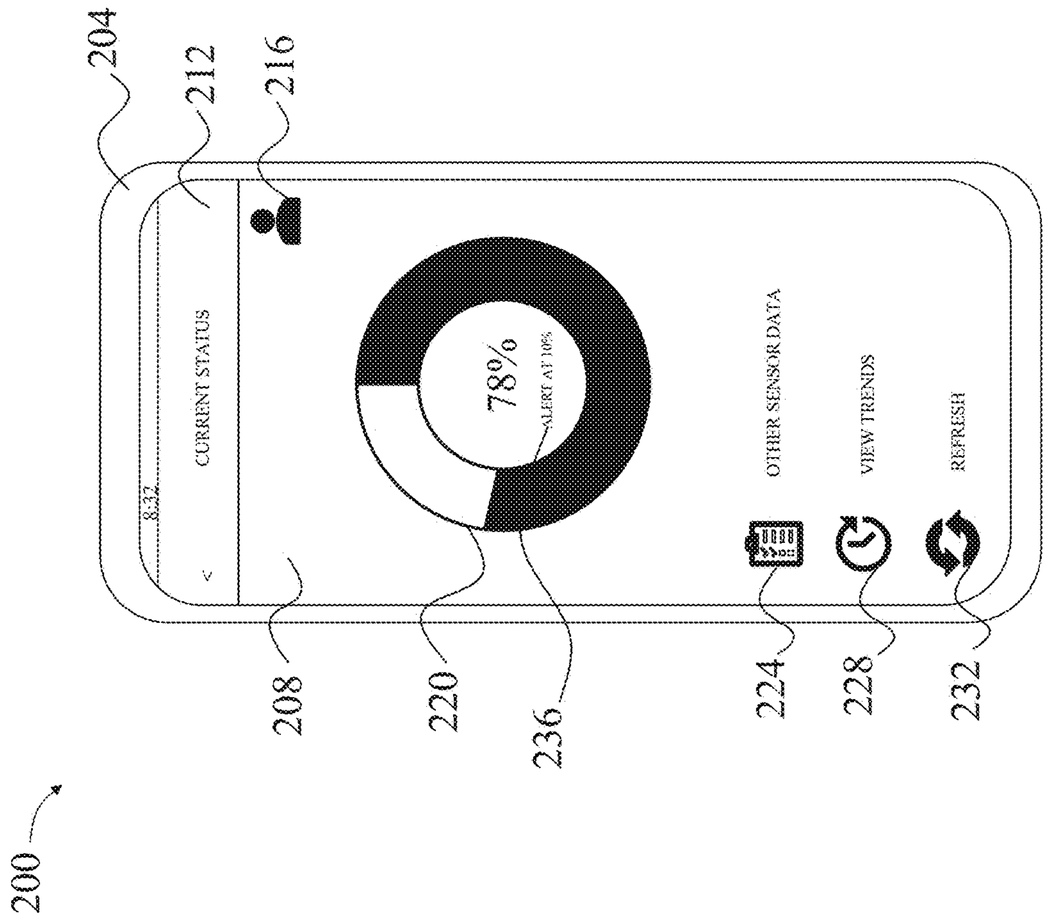
FIG. 2 is an illustration of graphical user interface displayed on a downstream device.

Referring now to FIG. 2, an illustration, 200, of graphical user interface displayed on a downstream device. In an embodiment, graphical user interface 208 may be displayed on downstream device 204 which may include graphical user interface 208, header 212, entity profile 216, chemical level 220, other sensor data button 224, historic data 228, and a refresh button 232. As used in this disclosure, a "graphical user interface" is a graphical form of user interface that allows users to interact with electronic devices. In some embodiments, GUI 208 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 2, as used in this disclosure, a "downstream device" is an electronic device that presents information to the entity. In an embodiment, downstream device may be responsible for receiving and processing data from the telematics system. In an embodiment, downstream device 204 may be implemented using various hardware configurations, such as a dedicated server, a cloud-based service, or an embedded system within the vessel. In an embodiment, downstream device 204 may process the sensor data collected by sensor and transmit the processed data to graphical user interface 208. In some cases, downstream device 204 may be configured to project or show visual content generated by computers, video devices, or other electronic mechanisms. In some cases, downstream device 204 may include a liquid crystal display (LCD), a cathode ray tube (CRT), a plasma display, a light emitting diode (LED) display, and any combinations thereof. In a non-limiting example, one or more display devices may vary in size, resolution, technology, and functionality. downstream device 204 may be able to show any data elements and/or visual elements as listed above in various formats such as, textural, graphical, video among others, in either monochrome or color. downstream device 204 may include, but is not limited to, a smartphone, tablet, laptop, monitor, tablet, and the like. Display device may include a separate device that includes a transparent screen configured to display computer generated images and/or information. In some cases, downstream device 204 may be configured to present a graphical user interface (GUI) to a user, wherein a user may interact with GUI 208. In some cases, a user may view GUI 208 through display. Additionally, or alternatively, processor 152 may be connected to downstream device 204. In one or more embodiments, transmitting plurality of sensor data may include displaying chemical level 220 at downstream device 204 using a user interface of graphical user interface 208.

With continued reference to FIG. 2, as used in this disclosure, a "user interface" is" is a digital display that presents information, options, interactive elements to users in an intuitive and visually appealing manner. In some embodiments, the user interface may include at least an interface element. As used in this disclosure, "at least an interface element" is a portion of the user interface. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler.

With continued reference to FIG. 2, as used in this disclosure, a "chemical level" is a specific section or element within GUI 208 that displays information about the current quantity or volume of a chemical substance within a storage container or system. Without limitation, chemical level 220 display might present real-time data, showing users the exact level of chemicals available. In a non-limiting example, chemical level 220 may assist with remote monitoring inventory and ensuring proper storage conditions. Without limitation, chemical level 220 indicator may be visualized through various graphical means such as a bar, gauge, or numerical value, providing a clear and immediate understanding of the chemical quantities present. Without limitation, chemical level 220 feature may be essential for users to track and manage chemical supplies effectively, preventing shortages or overfills, and ensuring safety and compliance with regulatory standards.

With continued reference to FIG. 2, as used in this disclosure, a "header" is the top section of GUI 208. In a non-limiting example, header 212 may contain essential information and navigation elements. In a non-limiting example, header 212 may include the title of the application or webpage, logo, and main menu options, such as tabs or links to different sections or features within the interface. In a non-limiting example, header 212 may display important icons or buttons, such as a search bar, notifications, user profile access, or settings. For example, without limitation, header 212 may include "CURRENT STATUS" to let the user know that is the interface for viewing the chemical's current quantity status as of the viewing date.

With continued reference to FIG. 2, as used in this disclosure, an "entity profile" is a component of graphical user interface 208. In an embodiment, entity profile may provide detailed information about the specific chemicals stored within a vessel owned or managed by the entity. In an embodiment, entity profile 216 may include data such as the chemical name, concentration, and any safety or handling instructions. In an embodiment, entity profile 216 may allow users to quickly access information about the chemicals, ensuring proper handling and usage.

With continued reference to FIG. 2, as used in this disclosure, an "other sensor data button" is an interactive visual element within GUI 208 that, when clicked or tapped, allows the user to access additional information from various sensors beyond the primary metrics displayed. In an embodiment, other sensor data button 224 may allow users to access additional sensor data collected by the plurality of sensors. In an embodiment, other sensor data button 224 may bring the user to a screen that includes information such as temperature, pressure, humidity, and the like within the vessel. In an embodiment, other sensor data button 224 may provide a convenient way for users to view and analyze various environmental parameters that may affect the stored chemicals. In an embodiment, other sensor data button 224 may be designed to provide users with a detailed view of sensor data that might not be immediately visible on the main screen, such as temperature, pressure, humidity, or leak detection data. In an embodiment, By selecting other sensor data button 224, users may gain a comprehensive understanding of all the sensor readings, enabling them to make informed decisions about the condition and safety of the chemical storage.

With continued reference to FIG. 2, as used in this disclosure, "historic data" is a feature of graphical user interface 208 that may allow users to view historical trends and patterns in the chemical levels and other sensor data. In an embodiment, historic data 228 may be displayed as line graphs, charts, or tables, providing users with insights into the long-term behavior of the chemicals and the effectiveness of the storage system. In an embodiment, historic data 228 may help users make informed decisions about chemical usage and storage practices.

With continued reference to FIG. 2, as used in this disclosure, a "refresh button" is a control element within graphical user interface 208. In a non-limiting example, refresh button 232 may allow users to manually update the displayed data. In an embodiment, by pressing refresh button 232, users may ensure that they are viewing the most current information available from the telematics system 140. In an embodiment, refresh button 232 may provide a simple and effective way to keep the graphical user interface 208 up-to-date with the sensor data and system status.

With continued reference to FIG. 2, illustration 200 may include a notification system, wherein the notification system is configured to conditionally generate the alert as a function of the plurality of sensor data and a predefined threshold. As used in this disclosure, a "notification system" is an element within a software application or platform designed to inform users about important events, updates, or actions that require their attention. In a non-limiting example, the notification system may deliver an alert through various channels such as pop-up alerts, banners, badges, emails, SMS, or push notifications on downstream device 204. As used in this disclosure, an "alert" is a notification or message that appears to inform the user of a particular event or condition requiring their attention. In a non-limiting example, an alert may be used to convey important information, warnings, errors, or other significant statuses that the user needs to be aware of. In a non-limiting example, an alert may appear as pop-up windows, banners, or messages within the graphical user interface 208, and may be accompanied by visual cues like icons or colors and sometimes sound. In a non-limiting example, an alert may be triggered by a wide range of events, including system updates, new messages, reminders, status changes, or security alerts. Without limitation, the alert may be generated when predefined threshold 236 is met. As used in this disclosure, a "predefined threshold" is a specific, predetermined value or limit set within a system or process. In a non-limiting example, predefined threshold 236 may include a certain level, volume, or concentration of liquid that, when reached, triggers a particular action or response. For example, predefined threshold 236 may be the minimum volume of liquid that must collect in the tapered section before it can be extracted efficiently, or it could indicate the maximum safe capacity of the container to prevent overflow. Setting predefined threshold 236 ensures consistent and controlled operation, helping to maintain optimal performance and safety standards within the system. In a non-limiting example, predefined threshold may trigger an alert when the contents of the vessel are at 10%.

Figure 3:
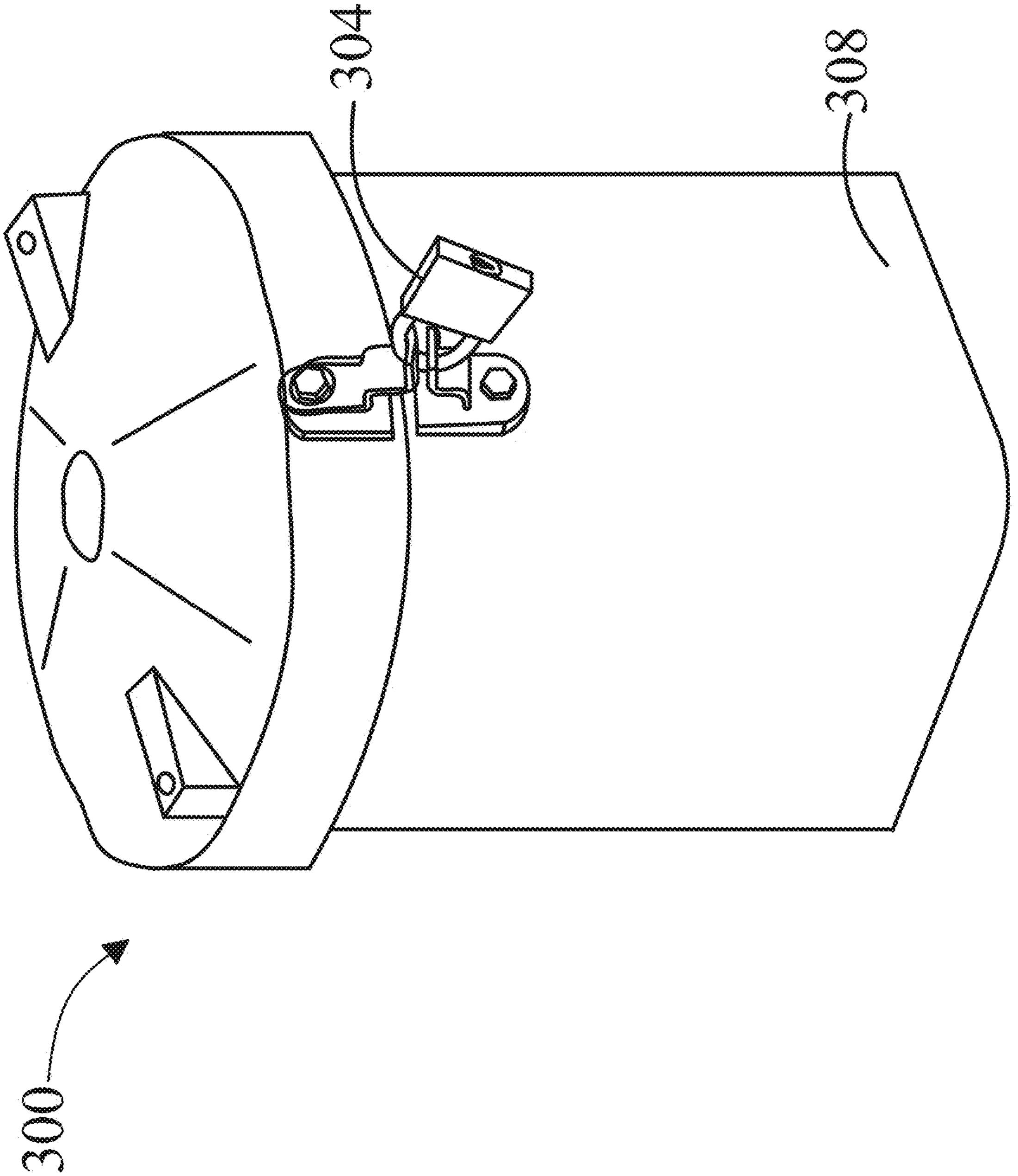
FIG. 3 is an illustration of vessel in closed configuration with locking mechanism coupled to exterior surface.

Referring now to FIG. 3, an illustration of vessel in closed configuration, 300, with locking mechanism 304 coupled to exterior surface 308. As used in this disclosure, a "locking mechanism" is a device or system designed to secure vessel 104 in a closed configuration. In an embodiment, locking mechanism 304 may secure the vessel 300 in a closed state, preventing unauthorized access and ensuring the contents remain contained. In an embodiment, locking mechanism 304 may be implemented using various types of locks, such as padlocks, combination locks, or electronic locks, depending on the security requirements and application. For instance, without limitation, a padlock may be attached to a hasp and staple mechanism mounted on exterior surface 308. Continuing, this type of lock may provide a basic level of security and make it suitable for applications where the risk of unauthorized access is relatively low. Continuing, the hasp and staple may be welded or bolted onto exterior surface 308, ensuring a robust attachment that may withstand environmental conditions and physical tampering.

With continued reference to FIG. 3, in another non-limiting example, combination locks may provide a higher level of security compared to padlocks, as they require a specific sequence of numbers to unlock. Continuing, combination locks may be integrated into a latch mechanism that is affixed to the exterior surface 308. Continuing, the latch mechanism may be designed with a built-in combination lock, eliminating the need for a separate locking device. Continuing, this setup is particularly useful in scenarios where multiple users need access to the interior of the vessel but do not want to manage physical keys. Continuing, the latch mechanism may be attached to the exterior surface 308 using screws or rivets, providing a secure and tamper-resistant solution.

With continued reference to FIG. 3, in another non-limiting example, electronic locks may provide the highest level of security and may be integrated with advanced access control systems. Continuing, electronic locks may be mounted on the exterior surface 308 and connected to a control panel or a remote access system. Continuing, electronic locks may use various authentication methods, such as keycards, biometric scans, or PIN codes, to grant access. Continuing, electronic locks may be ideal for high-security applications where it is crucial to monitor and control access to the vessel. Continuing, an electronic lock may be installed using a combination of adhesive and mechanical fasteners, ensuring a secure attachment that can withstand both environmental conditions and potential tampering. Additionally and or alternatively, electronic locks may be integrated with the telematics system to provide real-time access logs and alerts, enhancing the overall security of the vessel.

With continued reference to FIG. 3, in an embodiment, exterior surface 308 forms the exterior of the vessel 300, providing structural integrity and protection for the contents inside. In an embodiment, exterior surface 308 may be constructed from materials such as metal, plastic, or composite materials, chosen for their durability, resistance to environmental conditions, and compatibility with the stored chemicals.

Figure 4:
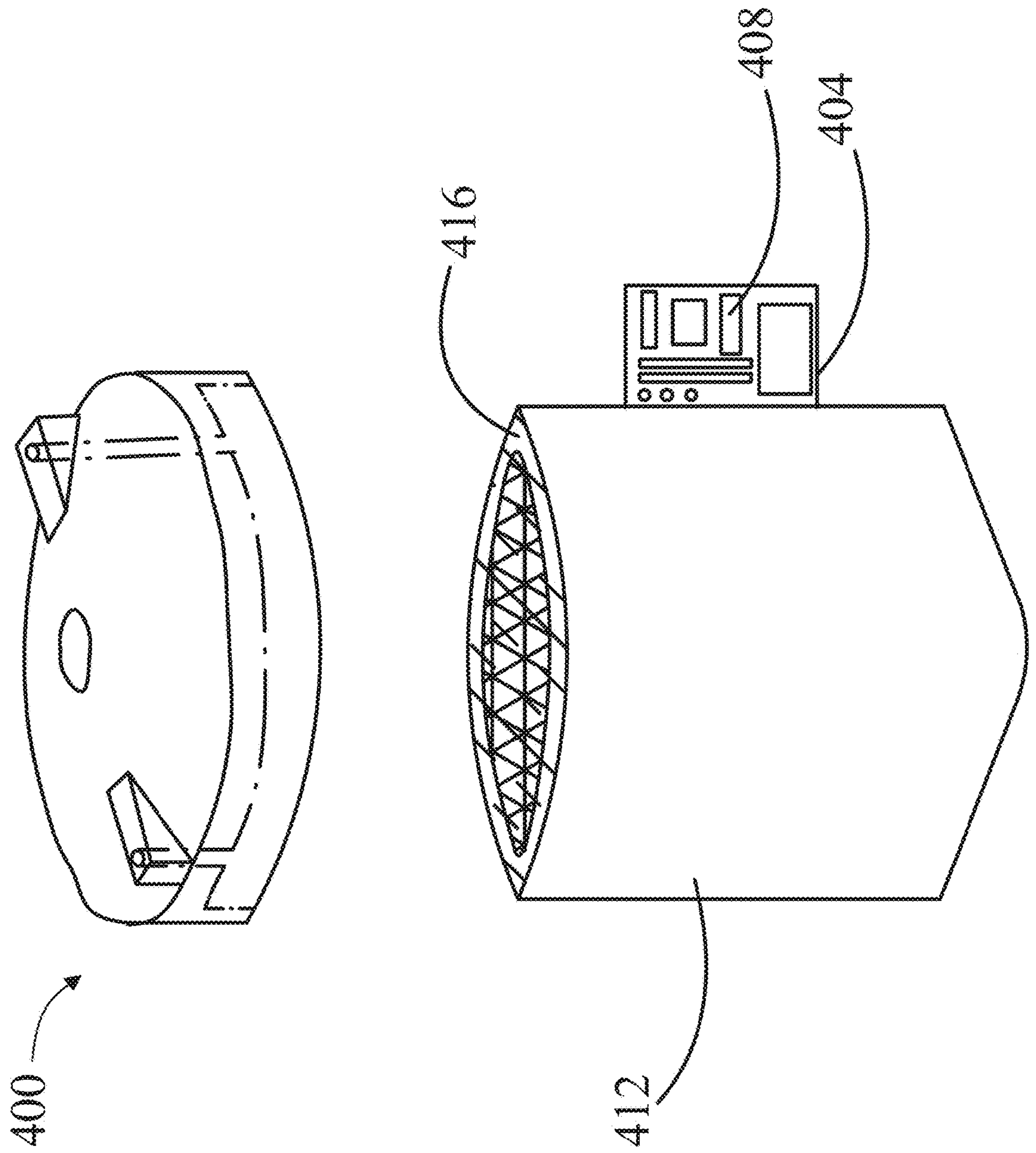
FIG. 4 is an illustration of a vessel in open configuration with a telematics system including a GPS module mounted to the vessel.

Referring now to FIG. 4, an illustration of vessel in open configuration, 400, with telematics system 404 including global positioning system (GPS) module 408 mounted to vessel 412 which provides geolocation data to the at least a processor. As used in this disclosure, a "GPS module" is a device that receives signals from global positioning system satellites to determine the precise geographic location of an object or system. In an embodiment, telematics system 404 may be mounted to the exterior shell of vessel 412. In an embodiment, telematics system 404 may include GPS module 408. In an embodiment, GPS module 408 may provide location tracking and monitoring capabilities. In an embodiment, GPS module 408 may be communicatively connected to telematics system 404, allowing for real-time location data to be transmitted and processed. In an embodiment, telematics system 404 may include other components such as sensors and communication modules to collect and transmit various sensor data related to vessel 412 and the contents of vessel 412. As used in this disclosure, "geolocation data" is information that indicates the geographical location of an object or person. In a non-limiting example, geolocation data may be derived from GPS module 408, cell tower triangulation, Wi-Fi positioning, IP address mapping, and the like. Without limitation, the geolocation data may provide coordinates or addresses specifying a precise location on the Earth's surface. Continuing, geolocation data may include latitude and longitude coordinates, altitude, time stamps, other relevant details that enable the identification of the exact position of a device or individual in real-time or historically, and the like.

With continued reference to FIG. 4, in an embodiment vessel 412 may include thermal insulation material 416, wherein thermal insulation material 416 may provide a temperature controlled environment inside vessel 412. As used in this disclosure, "thermal insulation material" is a substance or combination of substances used to reduce the transfer of heat between objects or spaces. Without limitation, thermal insulation material 416 may create a barrier that minimizes the conduction, convection, and radiation of heat, thereby maintaining a desired temperature in vessel 412. In an embodiment, thermal insulation material 416 may be integrated into vessel 412 to provide thermal protection for the stored chemicals. In an embodiment, thermal insulation material 416 may help to maintain a stable internal temperature, preventing the chemicals from freezing or degrading due to temperature fluctuations. In an embodiment, thermal insulation material 416 may be made from materials such as foam, fiberglass, or other insulating materials that provide effective thermal resistance. In a non-limiting example, thermal insulation material 416 may include one or more of fiberglass insulation, polystyrene foam, and aerogel.

Figure 5:
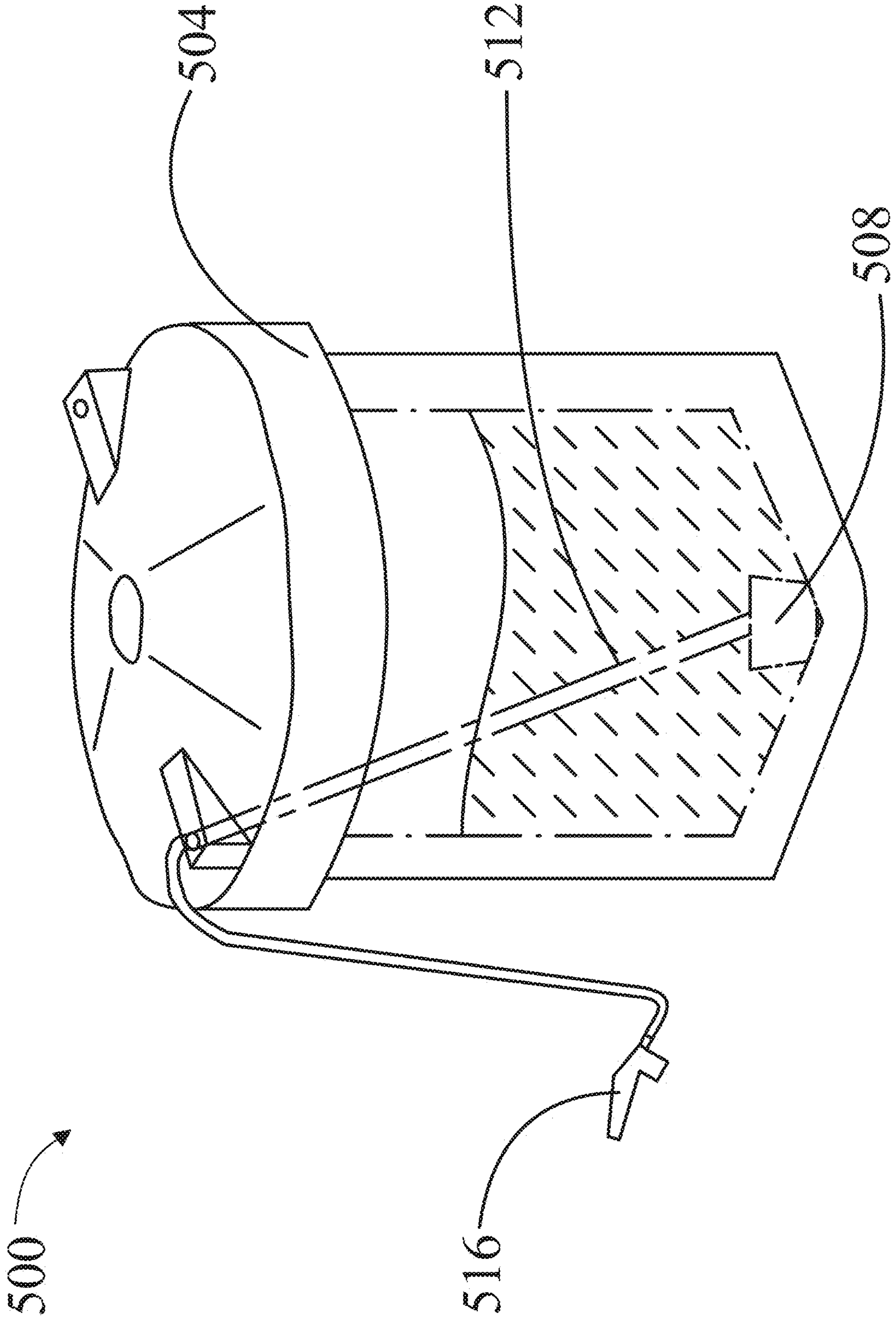
FIG. 5 is an illustration of a pump coupled to an interior surface of a vessel.

Referring now to FIG. 5, an illustration, 500, of a pump coupled to the interior surface of vessel. In an embodiment, vessel 504 may include pump 508 with hose 512 and nozzle 516. In an embodiment, pump 508 may be coupled to interior shell of vessel 504 and configured to move the at least a chemical from the interior shell to outside of vessel 504. In an embodiment, pump 508 may be responsible for transferring chemicals from the interior of vessel 504 to an external location. In an embodiment, pump 508 may be implemented using various types of pumps, such as centrifugal pumps, diaphragm pumps, or peristaltic pumps, depending on the specific requirements of the application. As used in this disclosure, a "centrifugal pump" is a type of pump that uses the principle of centrifugal force to move fluid through a piping system. Without limitation, a centrifugal pump operates by converting rotational kinetic energy. In a non-limiting example, centrifugal pump may use rotational kinetic energy from a motor or engine and convert it into hydrodynamic energy of the fluid flow. As used in this disclosure, a "diaphragm pump" is a type of positive displacement pump that uses a diaphragm and a set of check valves to move fluid. In a non-limiting example, the diaphragm may be made of rubber, thermoplastic, or a similar flexible material. In another non-limiting example, the diaphragm may be actuated by a mechanical, hydraulic, or pneumatic system to create a change in volume within the pump chamber. Continuing, this change in volume may generate suction and discharge forces that move the fluid through the pump. As used in this disclosure, a "peristaltic pump" is a type of positive displacement pump used for pumping a variety of fluids. Without limitation, the fluid may be contained within a flexible tube fitted inside a circular pump casing. Continuing, the rotor may include a number of "rollers" (or "wipers" or "shoes") attached to the external circumference to compress the flexible tube. Without limitation, as the rotors turn, the part of the tube under compression closes (or "occludes"), and thereby may force the fluid to be pumped to move through the tube. Additionally and or alternatively, as the tube opens to its natural state after the passing of the cam ("decompression"), fluid flow is induced to the peristaltic pump. Continuing, without limitation, this process is called peristalsis, and may be similar to how food is moved through the digestive system. In an embodiment, pump 508 may be designed to handle the chemical properties of the stored substances, ensuring efficient and safe transfer operations. In an embodiment, pump 508 may be powered by an electric motor, hydraulic system, or other suitable power sources, providing the necessary force to move the chemicals through the system.

With continued reference to FIG. 5, in an embodiment, hose 512 is connected to pump 508 and may serve as the conduit for transporting chemicals from vessel 504 to the desired destination. In an embodiment, hose 512 may be designed to withstand the chemical properties of the substances being transferred, ensuring safe and leak-free operation. In an embodiment, hose 512 may be constructed from materials such as reinforced rubber, thermoplastic, or other chemical-resistant materials. For example, without limitation, chemical-resistant materials may include elements of polytetrafluoroethylene (PTFE), also known as Teflon, which offers excellent resistance to a wide range of chemicals and high temperatures, ethylene propylene diene monomer (EPDM) rubber, which is highly resistant to acids, alkalis, and various solvents, and/or fluorinated ethylene propylene (FEP), which provides similar chemical resistance to PTFE but with greater flexibility. In an embodiment, the length and diameter of hose 512 may vary based on the specific application requirements, providing flexibility and adaptability for different use cases.

With continued reference to FIG. 5, in an embodiment, nozzle 516 may be attached to the end of hose 512. In an embodiment, nozzle 516 may be used to control the flow of chemicals being dispensed from vessel 504. In an embodiment, nozzle 516 may be equipped with various features, such as adjustable flow rates, shut-off valves, and spray patterns, to accommodate different dispensing needs. In an embodiment, nozzle 516 may be designed to provide precise control over the chemical flow, ensuring accurate and efficient application. In an embodiment, nozzle 516 may be made from materials that are resistant to the chemical properties of the substances being handled, ensuring durability and reliability during operation.

Figure 6:
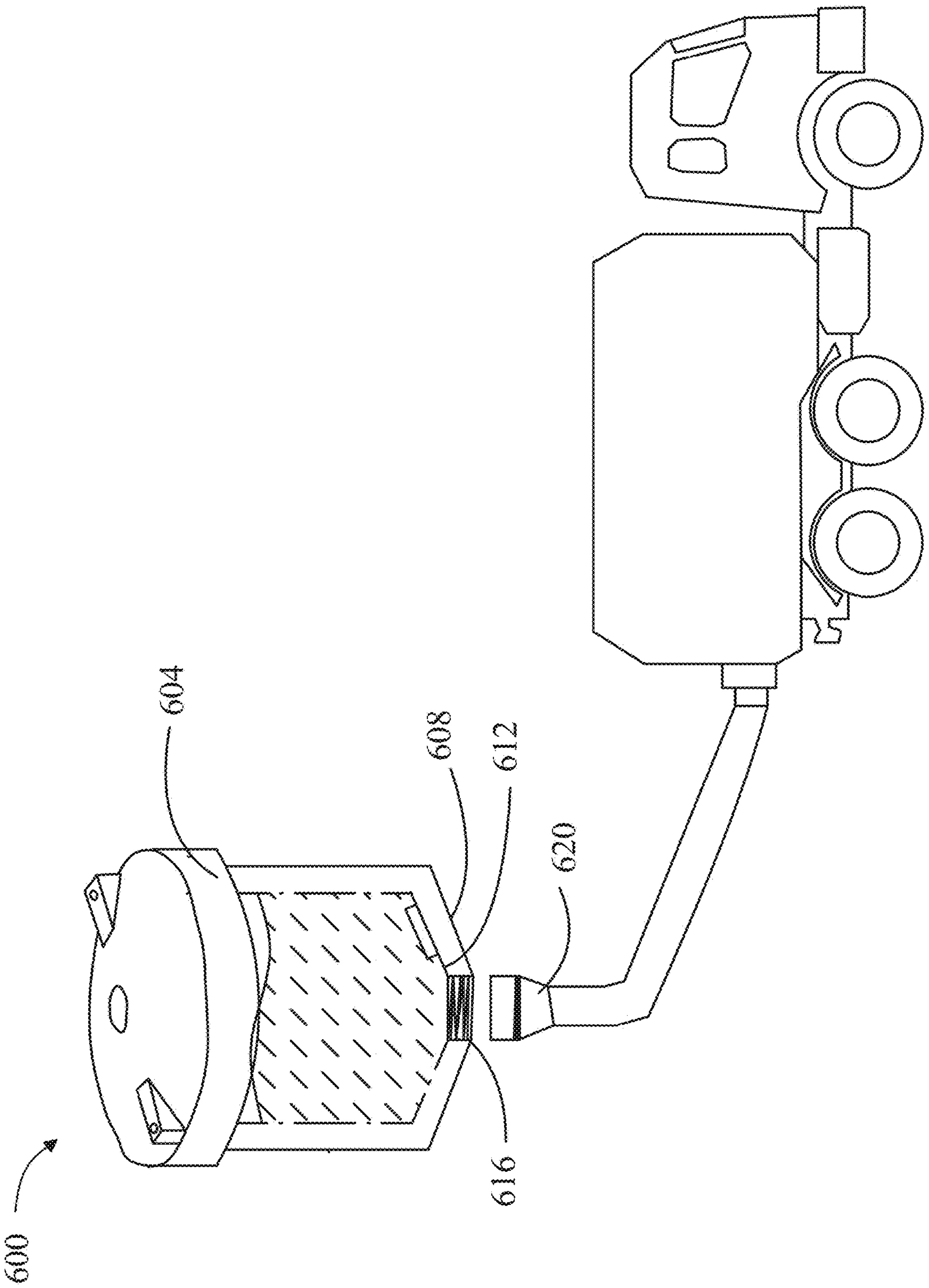
FIG. 6 is an illustration of a vessel with a bottom exterior surface and a bottom interior surface defining a bottom port, wherein the bottom port is configured to accept a delivery nozzle.

Referring now to FIG. 6, an illustration, 600, of vessel 604 with bottom exterior surface 608 and bottom interior surface 612 defining bottom port 616, wherein bottom port 616 may be configured to accept delivery nozzle 620. In an embodiment, bottom exterior surface 608 may form the lower exterior boundary of vessel 604. In an embodiment, bottom exterior surface 608 may be designed to provide structural support and stability to vessel 604. In an embodiment, bottom exterior surface 608 may be constructed from materials that offer durability and resistance to environmental conditions, ensuring the long-term integrity of vessel 604. In an embodiment, bottom exterior surface 608 may be coupled to bottom interior surface 612, which defines the lower interior boundary of vessel 604.

With continued reference to FIG. 6, in an embodiment, bottom interior surface 612 may be designed to contain the chemicals stored within vessel 604. In an embodiment, bottom interior surface 612 may be constructed from materials that are compatible with the stored chemicals, ensuring that the chemicals do not react with or degrade the surface. In an embodiment, bottom interior surface 612 may be coupled to bottom exterior surface 608, providing a sealed and secure containment area for the chemicals. In an embodiment, bottom interior surface 612 may define bottom port 616, which serves as an access point for dispensing the chemicals.

With continued reference to FIG. 6, in an embodiment, bottom port 616 is configured to accept delivery nozzle 620. In an embodiment, bottom port 616 may provide a controlled outlet for the chemicals stored within vessel 604. In an embodiment, bottom port 616 may be designed to accommodate various types of delivery nozzles, ensuring compatibility with different dispensing systems. In an embodiment, bottom port 616 may include features such as threaded connections, quick-connect fittings, or other mechanisms to securely attach delivery nozzle 620. As used in this disclosure, a "quick-connect fitting" is a type of connector designed for easy and rapid attachment and detachment of hoses, tubes, or pipes without the need for tools. Without limitation, the quick-connect fitting may be designed with a push-to-connect mechanism, allowing for a secure and leak-proof connection. As used in this disclosure, a "threaded connection" is a type of mechanical joint where components are connected by matching threads, typically in the form of helical ridges, that interlock when rotated. Without limitation, the threaded connection may provide a secure and tight seal that may be easily assembled and disassembled using standard tools. In an embodiment, bottom port 616 ensures that the chemicals can be dispensed safely and efficiently from vessel 604 without leaking the chemicals.

With continued reference to FIG. 6, in an embodiment, delivery nozzle 620 may be attached to bottom port 616 and serves as the conduit for dispensing the chemicals from vessel 604. In an embodiment, delivery nozzle 620 may be designed to control the flow of chemicals, providing precise and accurate dispensing. In an embodiment, delivery nozzle 620 may include features such as adjustable flow rates, shut-off valves, and spray patterns to accommodate different dispensing needs. In an embodiment, delivery nozzle 620 may be constructed from materials that are resistant to the chemical properties of the substances being handled, ensuring durability and reliability during operation.

Figure 7:
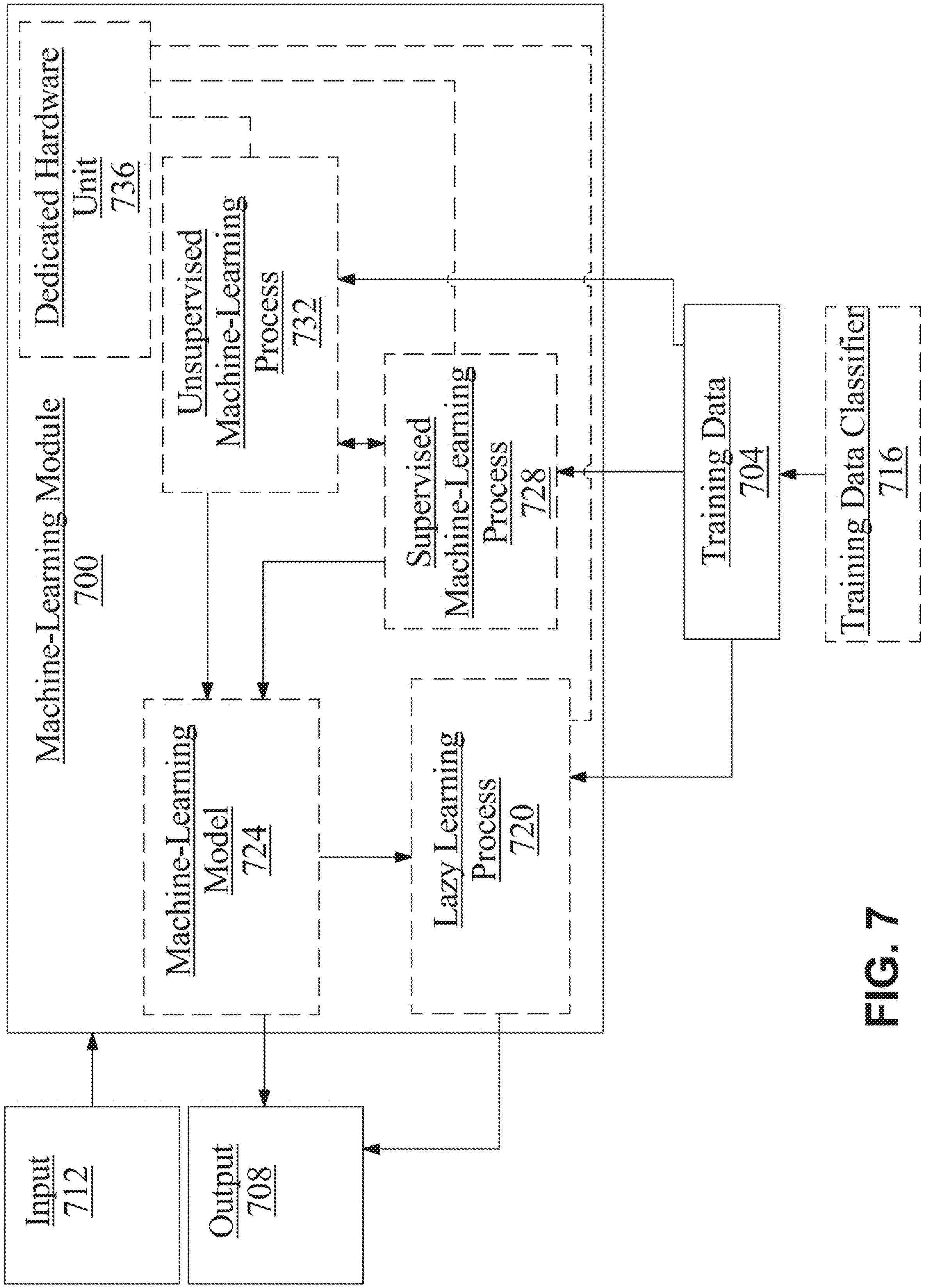
FIG. 7 is a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm instantiated in hardware or software logic, data structures, and/or functions that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example inputs may include sensor data and outputs may include a quantity of the at least a chemical inside the vessel.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to categorize the sensor data.

Still referring to FIG. 7, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)±P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 7, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 7, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 7, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 7, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 7, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 7, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 7, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 7, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 7, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 7, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include sensor data as described above as inputs, a quantity as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

With further reference to FIG. 7, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 7, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 732 may not require a response variable; unsupervised processes 732 may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 7, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 7, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 7, retraining and/or additional training may be performed using any process for training described above, using any current or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like. Further referring to FIG. 7, one or more processes or algorithms described above may be performed by at least a dedicated hardware unit 736. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 736 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 736 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 736 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 8:
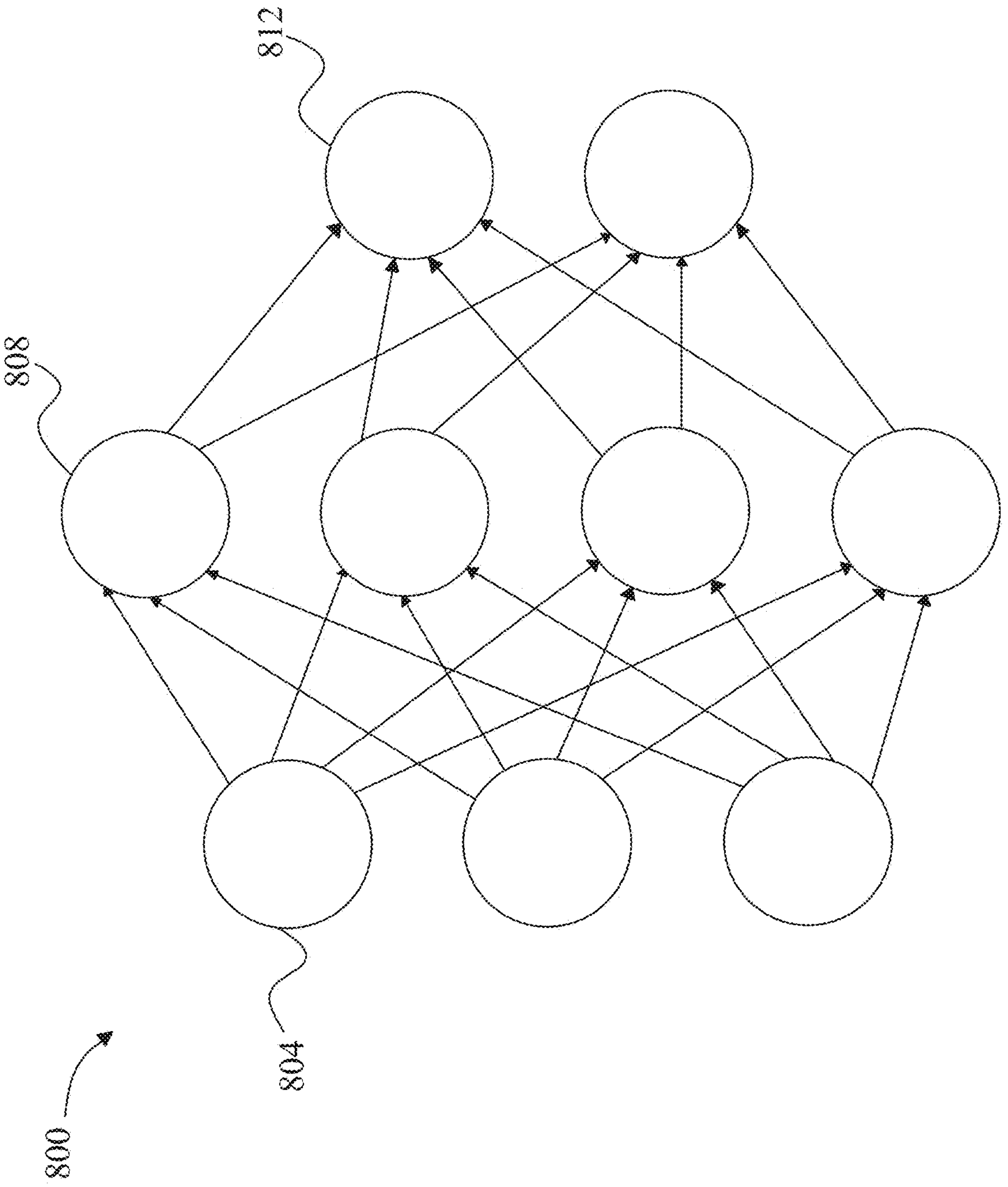
FIG. 8 is a diagram of an exemplary embodiment of a neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
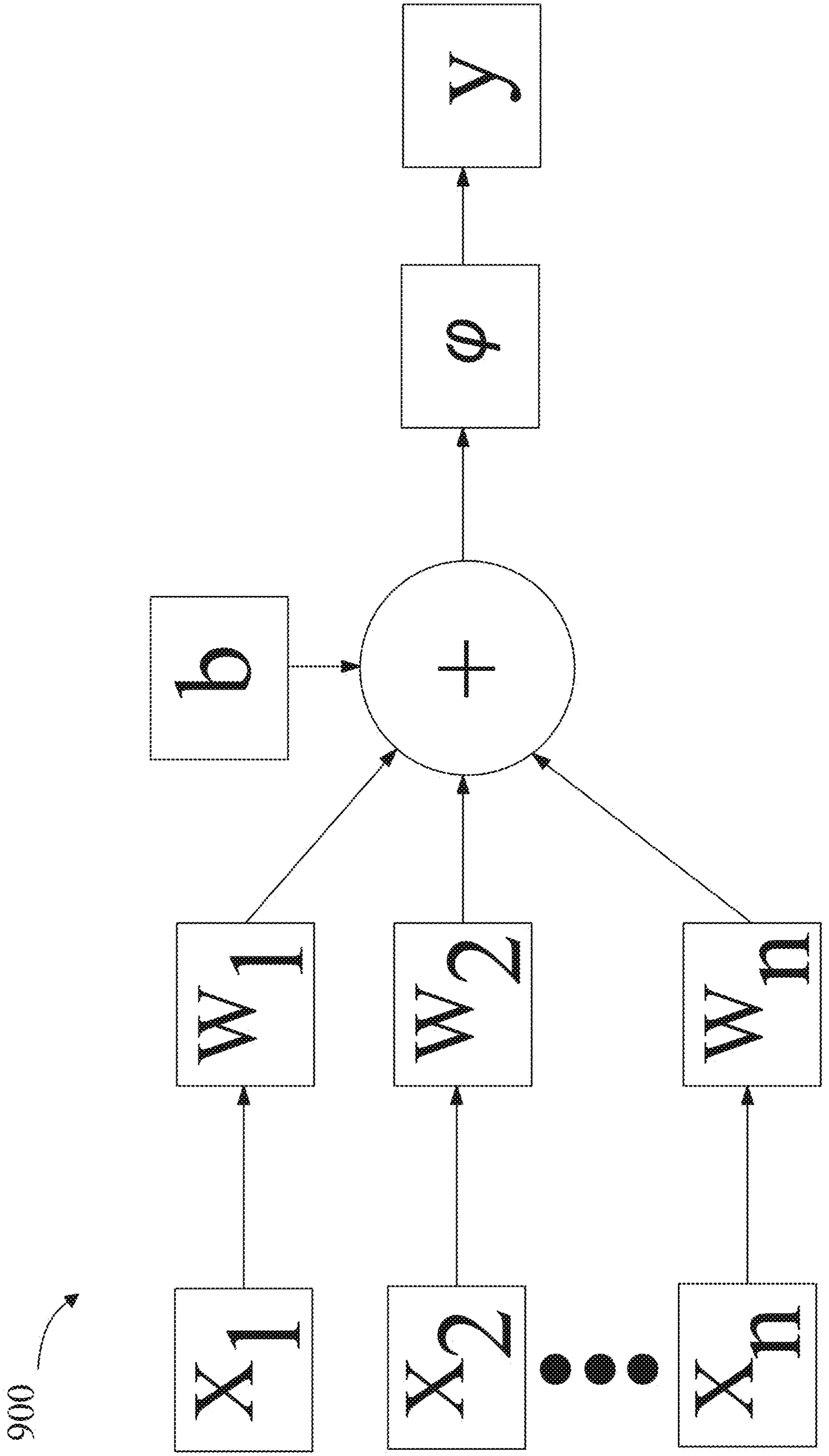
FIG. 9 is a diagram of an exemplary embodiment of a node of a neural network.

Referring now to FIG. 9, an exemplary embodiment of a node 900 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $f(x)=1/1-e^{-x}$ given input x, a tanh (hyperbolic tangent) function, of the form $e^x-e^{-x}/e^x+e^{-x}$, a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x)=\begin{cases} x \text{ for } x \geq 0 \\ \alpha(e^x-1) \text{ for } x<0 \end{cases}$$

for some value of α (this function may be replaced and/or weighted by its own derivative in some embodiments), a softmax function such $$f(x_i)=\frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x)=\lambda\begin{cases} \alpha(e^x-1) \text{ for } x<0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network exterior, a network switch, a network bridge, any machine capable of executing a sequence of instructions that specify an action to be taken by that machine, and any combinations thereof. In one example, a computing device may include and/or be included in a kiosk.

Figure 10:
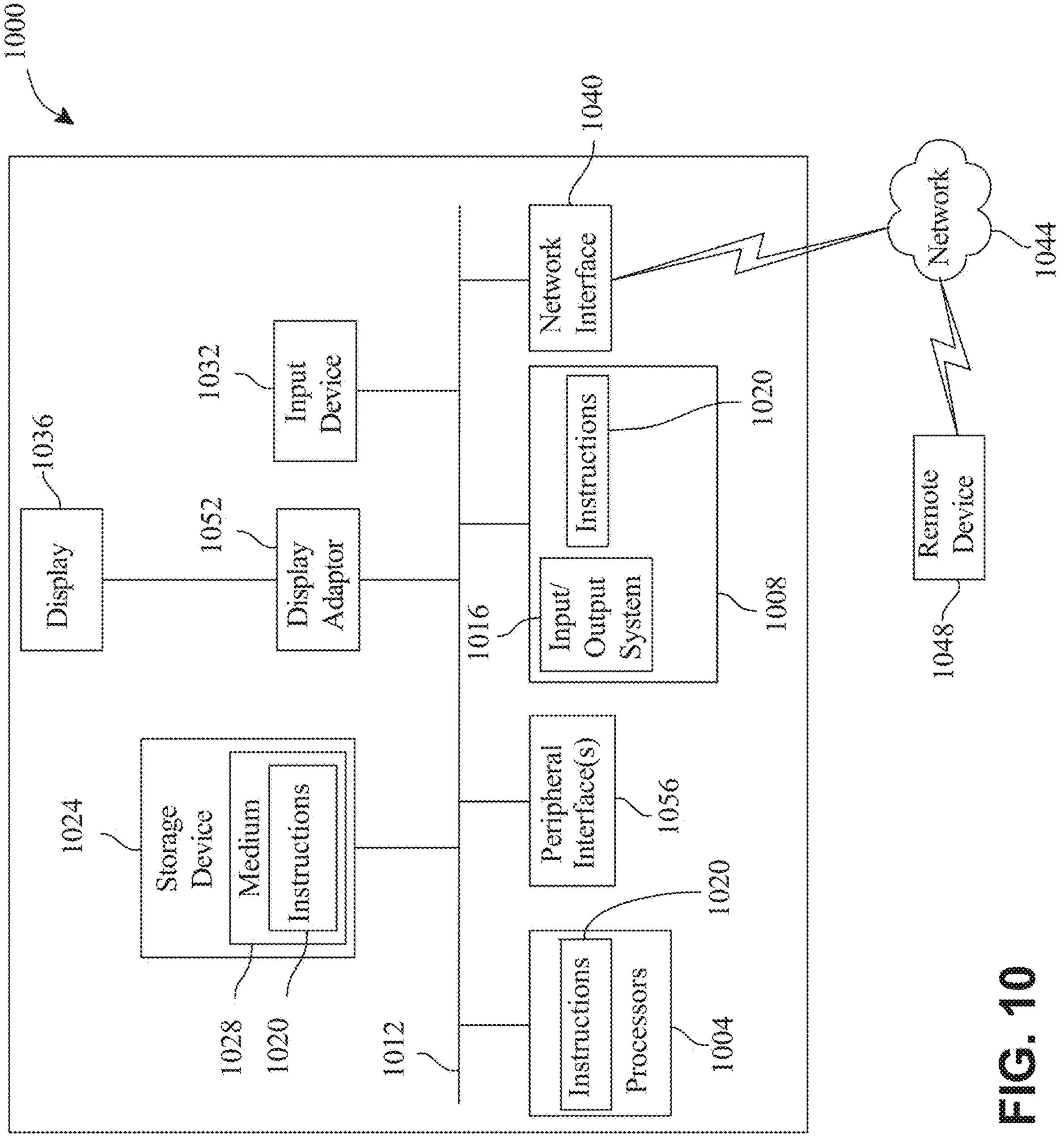
FIG. 10 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 10 shows a diagrammatic representation of one embodiment of computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 924 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display device 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for handling chemicals, wherein the apparatus comprises: a vessel comprising:

an exterior shell coupled to a top exterior surface and a bottom exterior surface, wherein the top exterior surface defines at least an input port and at least an output port and wherein the top exterior surface and the top interior surface is configured to open and close to permit access to the interior shell of the vessel;

an interior shell coupled to a top interior surface and a bottom interior surface, wherein the interior shell defines an internal volume configured to store at least a chemical; and an insulated space between the exterior shell and the interior shell;

a telematics system, wherein the telematics system comprises:

at least an ultrasonic sensor, mounted to the vessel, to collect a plurality of sensor data and wherein the plurality of sensor data identifies the volume of the at least a chemical and communicates with the at least an output port to close and prevent leaks based on the volume;

at least a global position system module mounted to the vessel, which provides geolocation data; and at least a computing device communicatively connected to the at least a sensor, wherein the computing device is configured to:

communicate the plurality of sensor data and geolocation data with a downstream device to provide remote monitoring of the at least a chemical and the at least an output port.

2. The apparatus of claim 1, wherein the telematics system is configured to remotely monitor a quantity of the at least a chemical inside the vessel.

3. The apparatus of claim 1, wherein the at least a computing device is configured to: receive the plurality of sensor data; and transmit an alert to a user.

4. The apparatus of claim 3, wherein the at least a computing device is further configured to conditionally generate the alert as a function of the plurality of sensor data and a predefined threshold.

5. The apparatus of claim 4, wherein the downstream device is configured to display, using a graphical user interface, the alert to the user.

6. The apparatus of claim 1, wherein the at least a sensor comprises one or more of a weight sensor, a volume sensor, a load cell, and an optical sensor.

7. The apparatus of claim 6, wherein the apparatus further comprises at least a locking mechanism coupled to the exterior shell of the vessel, wherein the locking mechanism is configured to prevent unauthorized access to the interior shell of the vessel.

8. The apparatus of claim 1, wherein the insulated space comprises a thermal insulation material, wherein the thermal insulation material provides a temperature controlled environment inside the vessel.

9. The apparatus of claim 8, wherein the thermal insulation material comprises one or more of fiberglass insulation, polystyrene foam, and aerogel.

10. The apparatus of claim 1, wherein the bottom interior surface of the vessel comprise a tapered shape characterized by a concentrate.

11. The apparatus of claim 1, wherein at least a pump is coupled to the interior shell of the vessel and configured to move the at least a chemical from the interior shell to outside of the vessel.

12. The apparatus of claim 11, wherein the pump comprises one or more of a diaphragm pump, a peristaltic pump, and a centrifugal pump.

13. The apparatus of claim 1, wherein the bottom exterior surface and bottom interior surface defines a bottom port, wherein the bottom port is configured to accept a delivery nozzle.

14. The apparatus of claim 13, wherein the bottom port comprises one or more of a threaded connections and a quick-connect fitting.

15. The apparatus of claim 1, wherein the exterior shell, top exterior surface, and the bottom exterior surface comprises one or more of stainless steel, carbon steel, fiberglass-reinforced plastic, and polyethylene.

16. The apparatus of claim 1, wherein the interior shell, the top interior surface, and the bottom interior surface comprises one or more of polyethylene, polypropylene, fiberglass-reinforced plastic, and polyvinylidene fluoride.

17. The apparatus of claim 1, wherein the bottom exterior surface comprises at least a durability feature.

18. The apparatus of claim 17, wherein the at least a durability feature comprises one or more of a ribbed feature, one or more drainable channels, a protective coating, one or more feet, and one or more mounting points.

* * * * *